United States Patent
Kato et al.

(10) Patent No.: US 7,446,920 B2
(45) Date of Patent: Nov. 4, 2008

(54) OPTICAL DEFLECTOR AND OPTICAL INSTRUMENT USING THE SAME

(75) Inventors: Takahisa Kato, Tokyo (JP); Yukio Furukawa, Mountain View, CA (US); Yasuhiro Shimada, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 11/753,066

(22) Filed: May 24, 2007

(65) Prior Publication Data
US 2007/0279726 A1     Dec. 6, 2007

(30) Foreign Application Priority Data
May 30, 2006   (JP) .............. 2006-149376

(51) Int. Cl.
*G02B 26/08* (2006.01)
(52) U.S. Cl. .................................... 359/224
(58) Field of Classification Search ......... 359/223–226, 359/291, 872
See application file for complete search history.

(56) References Cited

U.S. PATENT DOCUMENTS

| | | | |
|---|---|---|---|
| 4,859,846 A | 8/1989 | Burrer | |
| 6,850,349 B2 | 2/2005 | Miyajima et al. | |
| 6,924,915 B2 * | 8/2005 | Hirose et al. | 359/224 |

FOREIGN PATENT DOCUMENTS

| | | |
|---|---|---|
| JP | 9-197334 | 7/1997 |
| JP | 2002-321195 | 11/2002 |
| JP | 2004-069731 | 3/2004 |

OTHER PUBLICATIONS

C.S. Smith, "Piezoresistance Effect in Germanium and Silicon," Physical Review, vol. 94, No. 1, pp. 42-49, Apr. 1, 1954.

* cited by examiner

*Primary Examiner*—Euncha P Cherry
(74) *Attorney, Agent, or Firm*—Fitzpatrick, Cella, Harper & Scinto

(57) ABSTRACT

An optical deflector arranged to be relatively stably driven regardless of any environmental disturbance such as temperature, includes an oscillating system 160 having plural natural oscillation modes of different frequencies, a driving unit for driving the oscillating unit, and a drive control unit for supplying a driving signal to the driving unit, the oscillating system 160 including a first oscillator movable element 11 with a light deflecting element 22, a first torsion spring 12, a second oscillator movable element 13, a second torsion spring 12 and a supporting member 15, the optical deflector further including a distortion detecting element 25a and 25b for detecting mechanical deformation of the first and/or second torsion spring and a heat generating element 19, for stabilizing the frequencies of the natural oscillation modes and the state of scan to ensure stable sinusoidal-wave combined drive.

8 Claims, 10 Drawing Sheets

OPTICAL DEFLECTOR AND OPTICAL INSTRUMENT USING THE SAME

FIELD OF THE INVENTION AND RELATED ART

This invention relates to an optical deflector and an optical instrument such as an image forming apparatus or a display device, for example, using such optical deflector. The optical deflector of the present invention is suitably usable in a projection display wherein an image is projected based on deflective scan of light, or an image forming apparatus such as a laser beam printer or digital copying machine having an electrophotographic process, for example.

With regard to such optical deflectors, various types of optical scanning systems or optical scanning devices wherein a movable element having a reflection surface is sinusoidally oscillated to deflect light have been proposed. Optical scanning systems with an optical deflector sinusoidally oscillated based on a resonance phenomenon have advantageous features, as compared with scanning optical systems using a rotary polygonal mirror (polygon mirror), such as follows. That is, the optical deflector can be made quite small in size; the power consumption is low; and particularly those optical deflectors made of Si monocrystal and produced by semiconductor processes are theoretically free from metal fatigue and have good durability.

Depending on the application, such optical deflectors may have to be driven at a constant frequency. Thus, some proposals have been made to keep the frequency constant relative to a change in environmental temperature. An example is a method in which an oscillator having a movable element resiliently supported by a resilient torsion lever is equipped with a heating member to heat the resilient torsion lever thereby to keep the resilient torsion lever temperature constant regardless of an environmental temperature change and to stabilize the resonance frequency. In such structure, a frequency detecting element may be added to the torsion lever to detect the frequency (see Patent Documents Nos. 1 and 2).

There is another method in which an oscillator having a movable element resiliently supported by a pair of resilient torsion levers is fixed to a member having a thermal expansion coefficient larger than the oscillator, such that, with a temperature rise, a stress is produced in the resilient torsion lever in a direction canceling the change in rigidity, thereby to stabilize the resonance frequency (see Patent Document No. 3).

Furthermore, it is known as a piezoelectric resistance effect that, if deformation occurs in silicon, the electric resistance thereof changes in accordance with the stress caused by the distortion. There is a method based on this. That is, an electric resistor is formed at a diffusion region of silicon by injecting and diffusing impurities therein, and it is used to detect the deformation based on the aforementioned piezoelectric resistance effect (see Non-Patent Document No. 1).

On the other hand, some of the optical deflectors based on the resonance phenomenon use a method that two or more natural oscillation modes in the torsional oscillation direction are simultaneously exited to perform optical scanning different from the sinusoidal optical scan. This concerns such optical deflectors that two or more natural oscillation modes about the same central axis are simultaneously excited to produce chopping-wave-like approximately constant angular-speed scan (see Patent Document No. 4). FIG. 15 is a block diagram for explaining this type of optical deflector.

In FIG. 15, the optical deflector generally denoted at 1012 comprises a first movable element 1014, a second movable element 1016, a first torsion spring 1018 for connecting and resiliently supporting them, and a second torsion spring 1020 for resiliently supporting the second movable element 1016 and a mechanical ground surface 1023. All of these components can be torsionally oscillated about a torsional axis 1026, by means of a driving unit 1030. The first movable element 1014 has a reflection surface for deflecting light and, in response to the torsional oscillation of the first movable element 1014, light from a light source is scanningly deflected. With regard to the torsional oscillation about the torsional axis 1026, the optical deflector 1012 has a first-order natural oscillation mode of a reference frequency and a second-order natural oscillation mode of a frequency approximately triple the reference frequency. The driving unit 1030 drives the optical deflector 1012 at two frequencies: that is, the frequency of the first-order natural oscillation mode and the frequency which is triple the former but has the same phase. Hence, the optical deflector 1012 is torsionally oscillated based on the first-order natural oscillation mode as well as the second-order natural oscillation mode, simultaneously. As a result, the displacement angle of deflective scan of the light as reflected by the first movable element 1014 is based on superposition of these two oscillation modes, and it changes in an approximately chopping-wave like manner, not sinusoidally. As a result, with regard to the angular speed of deflective scan, the approximately constant angular-speed region becomes broader as compared with the displacement angle based on sinusoidal waves. Hence, the ratio of available region to the whole deflective scan range may be larger.

[Patent Documents]
No. 1: Japanese Laid-Open Patent Application No. H09-197334
No. 2: Japanese Laid-Open Patent Application No. 2004-69731
No. 3: Japanese Laid-Open Patent Application No. 2002-321195
No. 4: U.S. Pat. No. 4,859,846

[Non-Patent Document]
No. 1: C. S. Smith, "Physical Review", Vol. 94, No. 1, pp 42-49, Apr. 1, 1954

SUMMARY OF THE INVENTION

In an oscillating system such as shown in Patent Document No. 4 mentioned above and having plural oscillator movable elements and plural torsion springs, in order to produce sinusoidal-wave combined drive based on different frequencies, the amplitude and phase of individual frequency components of the driving waveform have to be kept at a desired value. In practical operational environment, however, because of disturbance from the environment such as, typically, temperature, these values are easily changeable and this makes the stable driving quite difficult to achieve.

The present invention in an aspect thereof provides an oscillating system based on resonance oscillation, wherein stable sinusoidal-wave combined drive is assured.

In accordance with an aspect of the present invention, there is provided an optical deflector, comprising: an oscillating system including a first oscillator movable element having a light deflecting element, a second oscillator movable element, a first torsion spring configured to couple said first and second oscillator movable elements with each other and to support said first oscillator movable element for torsional oscillation relative to said second oscillator movable element, a supporting member and a second torsion spring configured to couple said supporting member and said second oscillator movable element with each other and to support said second oscillator movable element for torsional oscillation about an axis the same as an oscillation axis of said first oscillator movable element, relative to said supporting member; a driving system configured to apply a driving force to said oscillating system; and a drive control system configured to supply a driving signal to said driving system; wherein said oscillating system further includes a distortion detecting element configured to detect mechanical deformation of at least one of said first and second torsion springs, and a heat generating element configured to heat said oscillating system, and wherein said oscillating system has at least two natural oscillation modes of different frequencies, about the oscillation axis.

In accordance with anther aspect of the present invention, there is provided a method of driving an optical deflector as recited above, which method comprises: an adjusting step for adjusting a heat generating amount of the heat generating element on the basis of a first detection signal of the distortion detecting element (which may be distortion amount information obtainable by, for example, relative measurement, i.e., a relative value of the distortion amount to be described later), so as to tune the frequency of the natural oscillation mode to a target frequency; and a correcting step for producing a correction signal for correcting a driving signal to be applied to the driving system, on the basis of a second detection signal of the distortion detecting element (which may be distortion amount information such as, for example, an absolute value of the distortion amount).

In accordance with a further aspect of the present invention, there is provided an optical instrument, comprising: a light source; an optical deflector as recited above; and one of a photosensitive member and an image display member; wherein said optical deflector is configured to deflect light from said light source and to direct at least a portion of the deflected light onto said photosensitive member or image display member.

The optical deflector according to the present invention may include an oscillating system having a heat generating element and a distortion detecting element. Hence, when it is applied as an optical deflector for performing optical scanning while plural natural oscillation modes are excited simultaneously, stable drive is assured. Details of this will be explained later with reference to an embodiment of the present invention.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
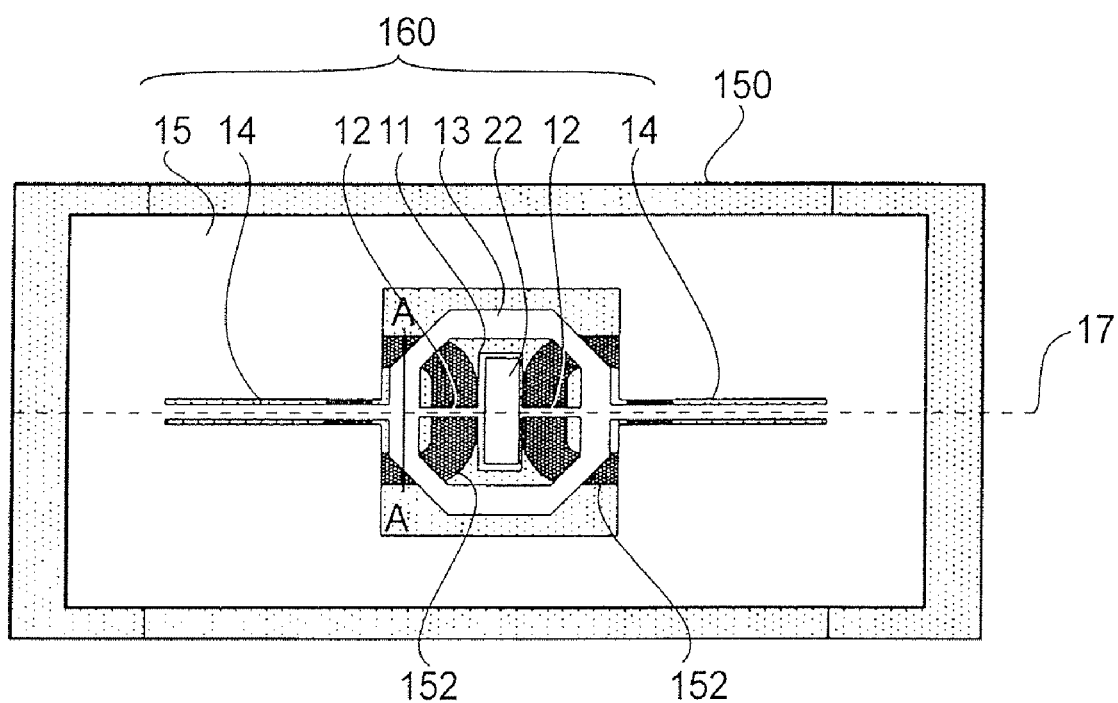
FIG. 1 is a plan view of an optical deflector according to a first working example of the present invention.

Preferred embodiments of the present invention will now be described with reference to the attached drawings.

One embodiment of the present invention will be explained first. In accordance with this embodiment, an oscillating system may be equipped with a heat generating element and a distortion detecting element for detecting mechanical distortion, to assure stabilization of plural natural oscillation frequencies as well as stabilization of detection of the state of scanning (state of oscillation of a movable element), thereby to accomplish stable sinusoidal-wave combined drive.

An optical deflector according to this embodiment for scanningly deflecting light from a light source may comprise an oscillating system, a stationary member for holding the oscillating system, a driving unit for applying a driving force to the oscillating system (the driving unit may include a magnet and a coil, for example, to be described later), and a drive control unit for supplying a driving signal to the driving unit. The oscillating system of this embodiment may include a heat generating element, a distortion detecting element for detecting mechanical distortion, a first oscillator movable element having a reflection surface (light deflecting element), a second oscillator movable element and a supporting member.

The first oscillator movable element may be resiliently coupled to the second oscillator movable element by a first torsion spring (resiliently supporting means), for torsional oscillation about an oscillation axis. The second oscillator movable element may be resiliently coupled to the supporting member by the second torsion spring (resiliently supporting means), for torsional oscillation about the oscillation axis. The supporting member may be fixed to the stationary member. The oscillating system may have at least two natural oscillation modes of different frequencies, and the driving unit may cause torsional oscillation of the oscillating system about the torsional axis, simultaneously at around the frequencies of these natural oscillation modes.

An optical deflector according to this embodiment of the present invention may have a structure that a heat generating element and a distortion detecting element for detecting mechanical distortion responsive to the torsional oscillation of two oscillator movable elements are directly provided at the oscillating system. Here, at least one of the supporting element, the first torsion spring and the second torsion spring may have such heat generating element. With this arrangement, even if an external condition such as environmental temperature changes, the temperature of the oscillating system can be held constant and, as a result, the frequency of natural oscillation mode of the oscillating system as well as the distortion amount detection output of the distortion detecting element, both having certain temperature characteristics, are stabilized.

This embodiment does not need use of any sensor outside the oscillating system to keep the oscillating system temperature constant. Instead, the temperature characteristic of the frequency of natural oscillation mode of the oscillating system and the temperature characteristic of the detection output of the distortion detecting element may be used in combination, and the oscillating system temperature can be held constant even if the environmental temperature changes.

The absolute value of a distortion amount detection signal of the distortion detecting element is easily changeable with the temperature, like a distortion detecting element based on a piezoelectric resistor used in a working example of the present invention to be described later. However, a relative quantity which is obtainable by relative measurement of the distortion amount is not susceptible to the temperature. This relative measurement may be based on relative comparison of distortion or measurement of timing whereat no distortion is produced.

On the other hand, the frequency of the natural oscillation mode of an oscillating system has a correlation with the temperature of the oscillating system. Therefore, by measuring the frequency of the natural oscillation mode which the oscillating system possesses, the temperature of the oscillating system temperature can be presumed.

Based on these features, in this embodiment, first of all, a suitable electric voltage may be applied to the heating element to control the heat generating amount thereof so that the frequencies of the natural oscillation modes of the oscillating system are tuned to the target frequencies to be used in the optical deflector. Here, without using any external temperature sensor, the frequencies of the natural oscillation modes may be measured based on the information about the distortion amount as outputted from the distortion detecting element and, on the basis of it, the amount of voltage application to the heating element may be controlled.

The frequency of the natural oscillation mode may be measured in various ways. A simple example may be that: the amount of voltage application to the heating element as well as the produced force of the driving unit are held constant on one hand, and the oscillating system is oscillated while changing the frequency of the driving signal of the same, on the other hand. While comparing the information regarding the amount of distortion outputted from the distortion detecting element, the frequency at the moment whereat a largest value of distortion is measured is detected as the frequency of natural oscillation mode.

Once the frequency of the natural oscillation mode has been tuned to the target frequency, due to the temperature characteristic of the frequency of the natural oscillation mode of the oscillating system, the optical deflector has a stably fixed temperature regardless of the environmental temperature. This means that, after the frequency of the natural oscillation mode is tuned to the target frequency, the temperature is constant. As a result, although the absolute value of the distortion amount output of the distortion detecting element may have a temperature characteristic, the output error becomes very small and the output is stabilized well. Therefore, based on the absolute value of the distortion amount output which is now stable as described, the drive control unit may produce a correction signal to correct the magnitude or phase or the like of the driving signal of two frequencies, to be excited in the oscillating system, as required for accomplishing a desired scanning operation. In this manner, the combined-wave drive of the oscillating system becomes more stable. This is why in this embodiment a heat generating element and a distortion detecting element may be used in combination in the oscillating system, and stable drive can be assured thereby.

In this embodiment as described above, a heat generating element and a distortion detecting element may be provided at the oscillating system to stabilize the frequencies of two natural oscillation modes and the distortion amount output of the distortion detecting element and also to stabilize the combined-wave drive.

Thus, when the present invention is applied to image formation, a light spot is produced stably. Furthermore, even if a lens is placed behind the optical deflector, the relationship between the position and speed of the optical scan is stabilized. Therefore, an optical scanning unit of better performance is accomplished.

Particularly, in this embodiment, the heat generating element may be directly disposed at the oscillating system. Therefore, the heat capacity of the heating region can be made small, and the time necessary for the temperature adjustment and stabilization can be shortened. Also, the power consumption can be made low.

The optical deflector according to the present invention is usable in an optical instrument such as image display device or image forming apparatus, for example. Such optical instrument may comprise a light source, an optical deflector as recited above and one of a photosensitive member and an image display member. The optical deflector may function to deflect light from the light source and to direct at least a portion of the deflected light onto the photosensitive member or image display member.

Next, specific working examples of the present invention will be described with reference to the drawings.

FIRST WORKING EXAMPLE

Figure 2A:
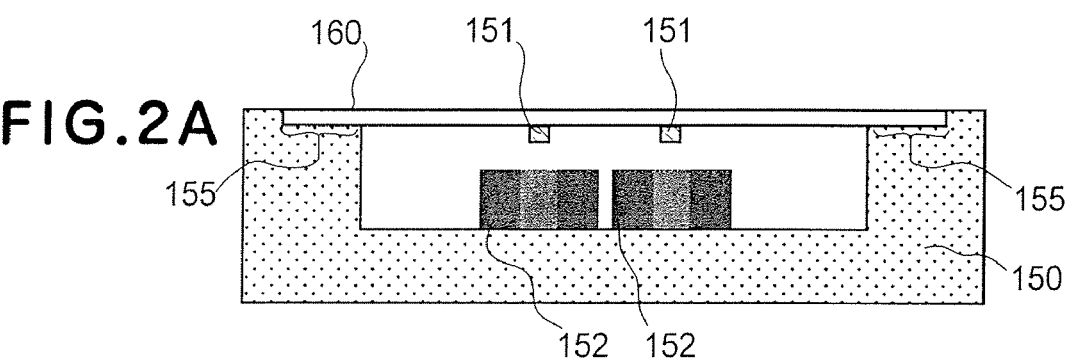
FIGS. 2A is a longitudinal section of the optical deflector according to the first working example of the present invention.
Figure 2B:
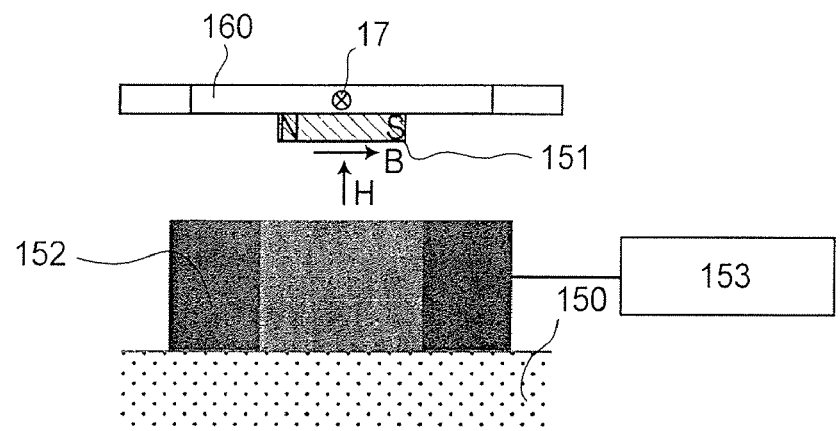
FIG. 2B is a cross-section of the optical deflector according to the first working example of the present invention, taken along a line A-A in FIG. 1.
Figure 5:
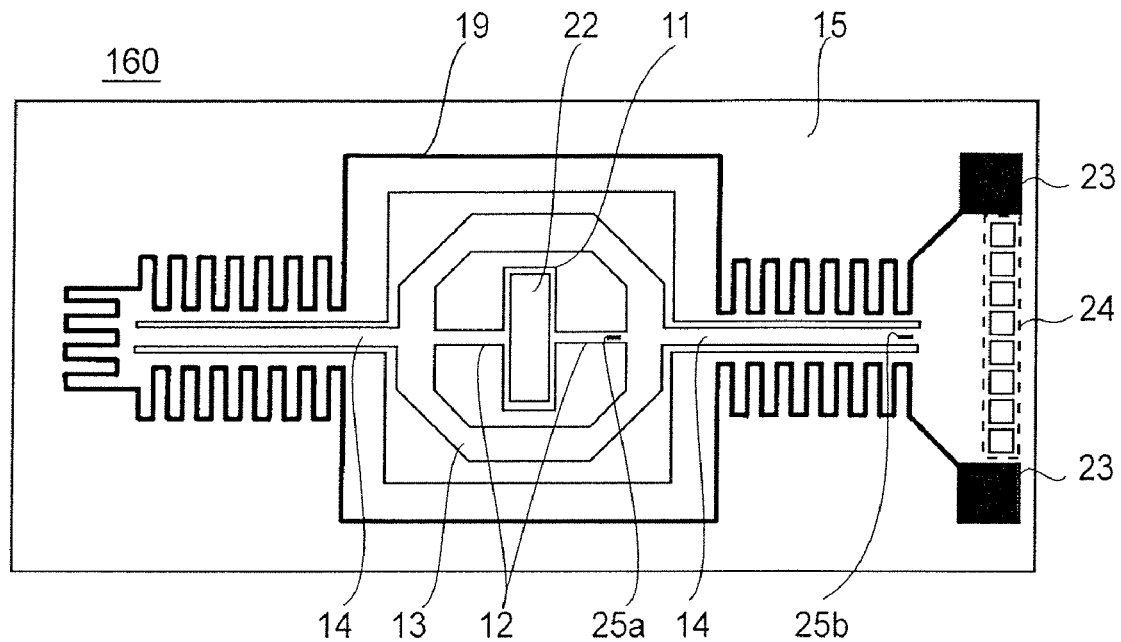
FIG. 5 is a plan view, showing the structure at a side of the oscillating system where a reflection surface is provided, in the first working example of the present invention.
Figure 6:
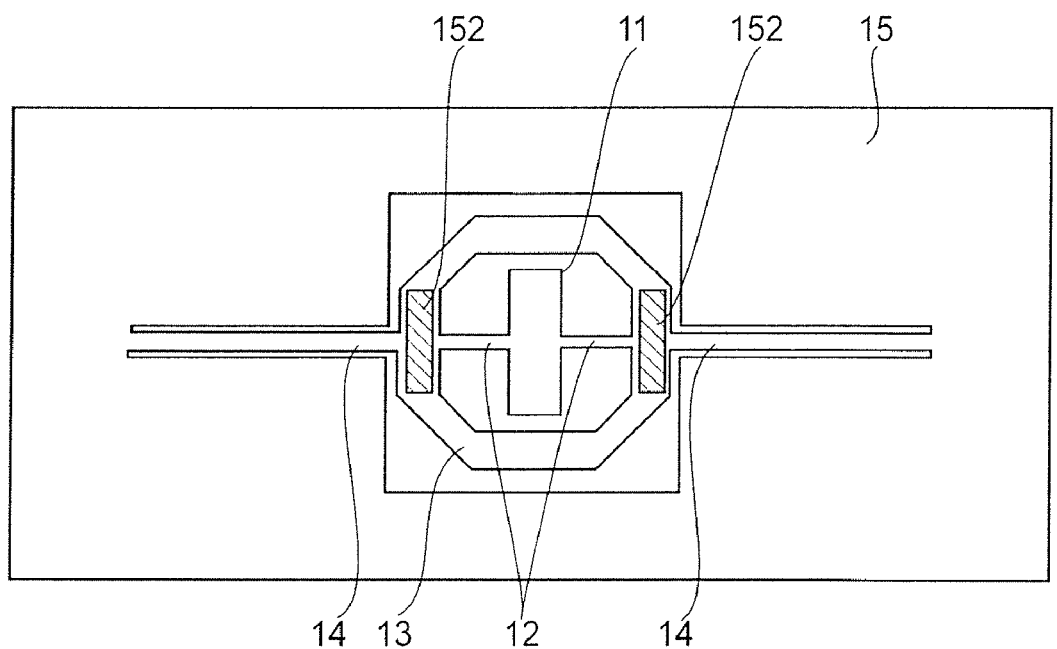
FIG. 6 is a plan view, showing the structure at a side of the oscillating system where no reflection surface is provided, in the first working example of the present invention.

FIGS. 1, 2A, 2B, 5 and 6 show an optical deflector according to a first working example of the present invention. Here, FIG. 1 is a plan view. FIG. 2A is a sectional view taken along a plane containing an oscillation axis 17 of FIG. 1 and perpendicular to the sheet of FIG. 1. FIG. 2B is a sectional view taken along a line A-A in FIG. 1. FIG. 5 is a plan view for explaining the structural components of an oscillating system 160 shown in FIG. 1, in greater detail. FIG. 6 is a plan view for explaining the structure of FIG. 5, when viewed from the bottom.

First of all, the driving principle in this working example will be explained below, together with the structure thereof. In this example, the oscillating system 160 shown in FIG. 1 makes torsional oscillation about the oscillation axis 17, through the driving unit to be described below. The structural components of the oscillating system 160 shown in FIG. 1, that is, a first oscillator movable element 11, first torsion springs 12, second oscillator movable element 13, second torsion springs 14 and supporting member 15, are produced integrally from a monocrystal silicon substrate by means of a photolithographic process and an etching process according to the semiconductor manufacturing method. Hence, the processing precision is very high, and a quite small oscillating system can be produced. Furthermore, since monocrystal silicon has a high Young's modulus and a small density, deformation due to the self-weight of the oscillator is very small. Therefore, an oscillating system having a large amplitude amplification factor during the resonance is accomplished.

In this working example, the first oscillator movable element 11 has a size 3 mm in a direction perpendicular to the oscillation axis 17 and a size 1 mm in a direction parallel to that axis. The whole length of the oscillating system 160 is about 15 mm. The first oscillator movable element 11 is resiliently supported by a pair of first torsion springs 12, for torsional oscillation about the oscillation axis 17. Similarly, the second oscillator movable element 13 is resiliently supported by a pair of second torsion spring 14, for torsional oscillation about the oscillation axis 17. Thus, the first oscillator movable element 11 and the second oscillator movable element 13 are disposed in series and resiliently supported, for torsional oscillation about the oscillation axis 17.

The first oscillator movable element 11 is formed with a reflection surface 22 as a light deflecting element for deflecting light, and it serves to scanningly deflect the light from the light source in response to the torsional oscillation of the first oscillator movable element 11. The reflection surface 22 is made of aluminum and formed by vacuum vapor deposition. This reflection surface may be made of any other materials such as gold or copper, for example. A protection film may be formed at the topmost surface thereof.

Here, since the first oscillator movable element 11 should be formed with a reflection surface 22, the flatness thereof during driving is particularly important. In this example, the first oscillator movable element 11 is supported at its opposite ends by means of a pair of torsion springs 12. Hence, as compared with the single-spring support, deformation due to the self-weight thereof is well avoided and better flatness is maintained.

In FIGS. 1, 2A, 2B and 6, a stationary member 150 and a driving unit are illustrated. As shown in these drawings, the driving unit of this working example comprises permanent magnets 151 adhered to the second oscillator movable element 13 and fixed coils 152 fixed to the stationary member 150. As shown in FIGS. 2A, 2B and 6, each permanent magnet 151 is a metal magnet of prism-like shape having a length of about 2 mm and a sectional size of 150 μm×150 μm. The permanent magnet 151 has its polarization (magnetization) direction extending along its lengthwise direction, and it is fixed to the second movable element 13 by an adhesive agent.

As seen from FIGS. 2A and 2B, the stationary member 150 serves to appropriately hold the position of the oscillating system 160 and permanent magnets 151 as well as the position of fixed coils 152. In response to application of a driving AC current from a drive control unit 153, the fixed coils 152 produce an alternating magnetic field in the direction of an arrow H shown in FIG. 2B. Since the magnetic flux density direction of the permanent magnet 151 is in the direction of an arrow B, the magnetic field produced by the fixed coils 152 generates a torque about the oscillation axis 17, and the oscillating system 160 is driven thereby. As shown in FIG. 2A, the supporting member 15 is adhered to the stationary member 150, at adhesion areas 155 by means of an adhesive agent. Further, as illustrated, the optical deflector of this working example has two adhesion areas 155 to fix the supporting member 15, having two second torsion springs 14 connected thereto.

Next, the driving principle of sawtooth-wave-like oscillation of the optical deflector according to this working example will be explained in greater detail. With regard to the torsional oscillation about the torsional axis 17, the oscillating system 160 of this example has a first-order natural oscillation mode of a frequency $f_1$ and a second-order natural oscillation mode of a frequency $f_2$ which is approximately twice a reference frequency. This oscillating system 160 can be treated as an oscillating system having a degree of freedom of "2" with respect to the torsional oscillation.

On the other hand, the fixed coil 152 drives the oscillating system 160 in accordance with a combined driving signal based on the reference frequency $f_0$ (target driving frequency as determined by the specifications of the system application) and a frequency $2f_0$ which is twice the reference frequency. The reference frequency $f_0$ and the natural oscillation mode frequencies $f_1$ and $f_2$ have a relationship described below, and the optical deflector of this example performs combined-wave drive with low power consumption, based on a large dynamic-to-static modulus ratio (amplitude amplification factor) of natural oscillation mode.

Particularly, the natural mode frequency $f_1$ is designed close to the reference frequency $f_0$. Here, if the mode damping ratio (which represents sharpness of the peak, at the natural mode frequency, of the dynamic-to-static modulus ratio curve and which is approximately equal to ½Q) of the first-order and second-order natural oscillation modes is denoted by $\gamma_1$ and $\gamma_2$, respectively, the range thereof is expressed as follows.

$$f_0(1-2\gamma_1) < f_1 < f_0(1+2\gamma_1) \tag{1}$$

Furthermore, in this specification, the following range is set with respect to the frequency ratio between the natural mode frequencies $f_1$ and $f_2$, and this is called "approximately twice".

$$-2(\gamma_1 + \gamma_2) + 1 < 2\frac{f_1}{f_2} < 2(\gamma_1 + \gamma_2) + 1 \tag{2}$$

Additionally, in this working example, the frequency ratio is in the following range.

$$-(\gamma_1 + \gamma_2) + 1 < 2\frac{f_1}{f_2} < (\gamma_1 + \gamma_2) + 1 \tag{3}$$

In the oscillating system 160 of this example, $\gamma_1$ is about 0.001 and $\gamma_2$ is about 0.00025. Thus, as is seen from Equations (1) to (3), in this example, by means of the fixed coil 152, oscillations of $f_0$ and $2f_0$ are excited at around the peaks of two natural oscillation modes, and the oscillating system 160 is driven based on it. Particularly, in the range defined by Equation (1), with regard to the oscillation of frequency $f_0$ which is a main component of the consumed electric power for the sinusoidal-wave combined drive, a range having large dynamic-to-static modulus ratio (amplitude amplification factor) of the first-order natural oscillation mode can be used. Therefore, the power consumption of the optical deflector is lowered.

The driving method will be explained in more detail.

Figure 3:
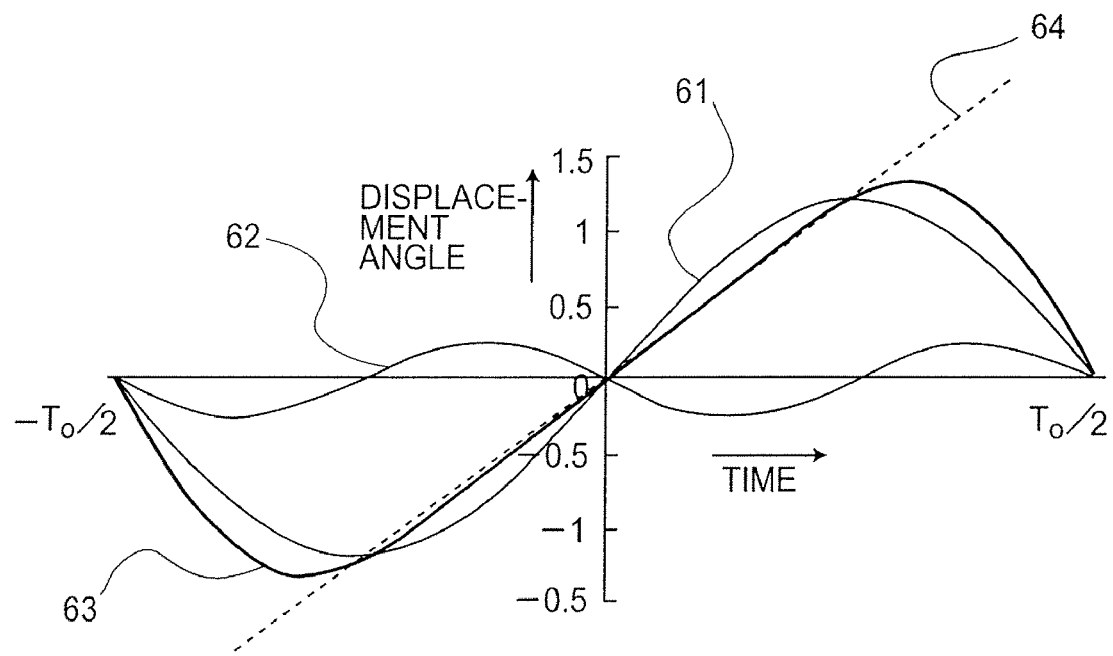
FIG. 3 is a graph for explaining the displacement angle of light scanningly deflected by the optical deflector according to the first working example of the present invention.

FIG. 3 is a graph with time t taken on the axis of abscissa, and it explains the displacement angle of the first oscillator 11 during torsional oscillation of a frequency $f_0$ (in this specification, since the displacement angle of reciprocal oscillation of the movable element and the displacement angle of light deflectively scanned by the optical deflector are different only with respect to the constant, they are treated as equivalent). Specifically, FIG. 3 illustrates the portion corresponding to one cycle $T_0$ of the torsional oscillation of the first oscillator movable element 11 ($-T_0/2<X<T_0/2$).

Curve 61 depicts the component of reference frequency $f_0$, of the driving signal that drives the fixed coil 152. It is a sinusoidal oscillation which reciprocally oscillates within the range of largest amplitude $\pm\phi_1$ and is expressed by Equation (4) below, where time is t and angular frequency is $w_0=2\pi f_0$.

$$\theta_1=\phi_1 \sin [w_0 t] \quad (4)$$

On the other hand, curve 62 depicts the frequency component twice the reference frequency $f_0$, and it is sinusoidal oscillation which oscillates in the range of largest amplitude $\pm\phi_2$ and is expressed by Equation (5) below.

$$\theta_2=\phi_2 \sin [2w_0 t] \quad (5)$$

Curve 63 depicts the displacement angle of the torsional oscillation of the first oscillator movable element 11 produced as a result of the drive described above. With regard to the torsional oscillation about the torsional axis 17, the optical deflector has a natural oscillation mode of frequency $f_1$ and a second-order natural oscillation mode of frequency $f_2$, being adjusted around the reference frequency $f_0$ and the frequency $2f_0$ twice the reference frequency, as described hereinbefore. Hence, both resonance excited by the driving signal corresponding to $\theta_1$ and resonance excited by the driving signal corresponding to $\theta_2$ occur in the optical deflector. Namely, the displacement angle of the first oscillator movable element 11 in curve 63 is based on the oscillation provided by superposition of these two sinusoidal oscillations; that is, a sawtooth-wave-like oscillation that can be expressed by Equation (6) below is produced.

$$\theta=\theta_1+\theta_2=\phi_1 \sin [w_0 t]+\phi_2 \sin [2w_0 t] \quad (6)$$

Figure 4:
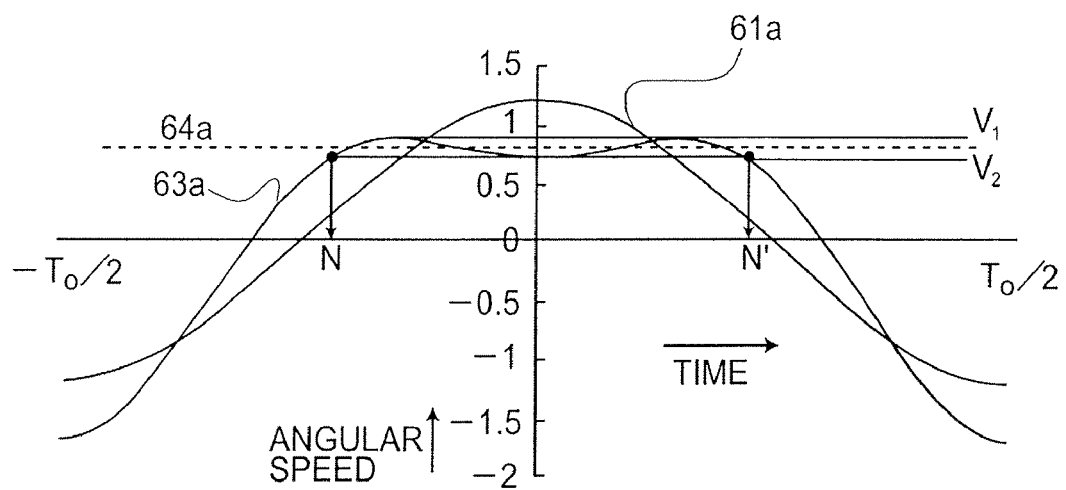
FIG. 4 is a graph for explaining the angular speed of light scanningly deflected by the optical deflector according to the first working example of the present invention.

FIG. 4 shows curves 61a and 63a and a straight line 64a, obtained by differentiating the curves 61 and 63 and a straight line 64 of FIG. 3, and it illustrates the angular speed of these curves. As compared with the curve 61a which depicts the angular speed of sinusoidal oscillation of reference frequency $f_0$, the curve 63a that depicts the angular speed of sawtooth-wave-like reciprocal oscillation of the first oscillator movable element 11 has a feature that in the section N-N' the angular speed is kept within the range having upper and lower limits corresponding to the angular speed $V_1$ at the maximum and the angular speed $V_2$ at the minimum, respectively. Thus, if, in the application based on optical deflective scan using the optical deflector, $V_1$ and $V_2$ are present within the allowable error range of angular speed from the straight line 64a which corresponds to constant angular-speed scan, the section N-N' can be regarded as a substantially constant angular-speed scan region.

As described above, as compared with the oscillation based on the displacement angle following sinusoidal waves, the sawtooth-wave reciprocal oscillation does provide, for the angular speed of deflective scan, a much wider region in which the angular speed is substantially constant. Thus, the ratio of available region to the whole deflective scan region is notably enlarged. Furthermore, the sawtooth-wave based drive ensures regular intervals of scan lines, and this is quite advantageous in the application to printers, for example.

Although the foregoing description has been made with reference to an example wherein the frequencies $f_1$ and $f_2$ of natural oscillation modes have a "double" relationship that the latter is approximately twice the former, a "triple" relationship wherein the latter is approximately three times the former may be set. In that occasion, like the "double" relationship, through the oscillation based on superposition of sinusoidal waves, chopping-wave-like oscillation is provided. Since this enables utilization of reciprocal scan of light, the number of scan lines at a certain available frequency can be doubled.

Also, in optical deflectors wherein sinusoidal oscillation is made based on a single frequency, stable scan would be attainable only by setting the scanning amplitude at a desired value. Even if the frequency of natural oscillation mode shifts, the symmetry of largest amplitude at the opposite ends from the scan center (i.e., symmetry of scanning) or the waveform of optical scanning (i.e., sinusoidal wave) changes little.

However, in oscillating systems wherein characteristic drive is made by combining plural sinusoidal waves as in this working example, if the amplitude or phase of individual sinusoidal waves to be combined deviates from a target value, not only the scanning amplitude but also the symmetry of scan or sawtooth-wave-like scanning waveform as defined by Equation (6) are adversely affected thereby.

Hence, for the driving according to Equation (6), it is quite important to take three variables $\phi_1$, $\phi_2$ and $\alpha$ in the following equation as target values and to keep them constant.

$$\theta=\theta_1+\theta_2=\phi_1 \sin [w_0 t]+\phi_2 \sin [2w_0 t+\alpha] \quad (7)$$

Here, depending on the frequency difference of the frequencies $f_1$ and $f_2$ of two natural oscillation modes of the oscillating system 160 from the target frequencies $f_0$ and $2f_0$, the amplitude to be actually produced and the phase delay from the driving signal differ. Hence, if the frequencies $f_1$ and $f_2$ of the natural oscillation modes change, the three variable $\phi_1$, $\phi_2$ and $\alpha$ in Equation (7) change, causing deterioration of the scanning waveform.

Particularly, the optical deflector is very susceptible to an environmental temperature, and the Young's modulus, volume or stress state of the components constituting the oscillating system 160 easily changes. These changes in turn cause a change of the frequencies $f_1$ and $f_2$ of the natural oscillation modes of the oscillating system 160. For example, in the optical deflector of this working example, the frequency $f_1$ of the first-order natural oscillation mode has a rate of change to the temperature of $(\Delta f_1/f_1)/\Delta T=160$ ppm/K, and the frequency $f_2$ of the second-order natural oscillation mode has a rate of change to the temperature of $(\Delta f_2/f_2)/\Delta T=170$ ppm/K.

Since the three variables $\phi_1$, $\phi_2$ and $\alpha$ in Equation (7) are changeable with a change in environmental temperature, the sinusoidal-wave combined drive is unstable. It is seen from this that, if the temperature of the oscillating system 160 is made constant against the change of environmental temperature, the sinusoidal-wave combined drive would be stabilized. Furthermore, if the three variables $\phi_1$, $\phi_2$ and $\alpha$ in Equation (7) are detected exactly, the driving signal can be corrected in accordance with the detected values of the variables so as to assure desired combined-wave scan. Thus, more stable driving would be attainable.

Based on these findings, in this working example, a heater wire 19 and distortion detecting elements 25a and 25b are provided at the oscillating system 160, as shown in FIG. 5.

FIG. 5 is a plan view, showing the components of the driving system 160 in greater detail. Particularly, it illustrates the structure at a side where the reflection surface 22 is formed. The heater wire 19 extends around along the supporting member 15 as illustrated. Electrode terminals 23 are formed at the opposite ends of the heater wire, and these terminals 23 are connected to a driving voltage source, not shown, for applying an electric current to the heater wire 19. The distortion detecting elements 25a and 25b are formed on the first and second torsion springs 12 and 14, respectively. The distortion detecting elements 25a and 25b are electrically connected to electrode terminals 24, respectively. These terminals 24 are connected to a driving electrode circuit and a detecting circuit, both not shown in the drawing.

In this working example, the heater wire 19 comprises a thin-film resistor made of aluminum. The heater wire 19 can be formed as follows. At a pre-process for the dry etching of the oscillating system 160, an aluminum coating is formed by vacuum vapor deposition. Subsequently, the aluminum thin film is patterned based on photolithography, whereby a heater wire 19 of the shape shown in FIG. 5 is accomplished. When in operation an electric voltage is applied to the heater wire 19, heat is generated in accordance with the amount of applied electric current. Thus, by means of this heater wire 19, the temperature of the oscillating system 160 as a whole can be controlled.

Here, the oscillating system 160 is integrally made from monocrystal silicon, and has a good heat conductivity. Thus, the heat generated by the heater wire 19 is efficiently transferred to the oscillating system 160. Furthermore, the heater wire 19 is formed only at the supporting member 15, and this means that the heater wire 19 is formed at a portion where mechanical deformation does not easily occur. Hence, breakage of the heater wire 19 is well avoided.

Figure 9A:
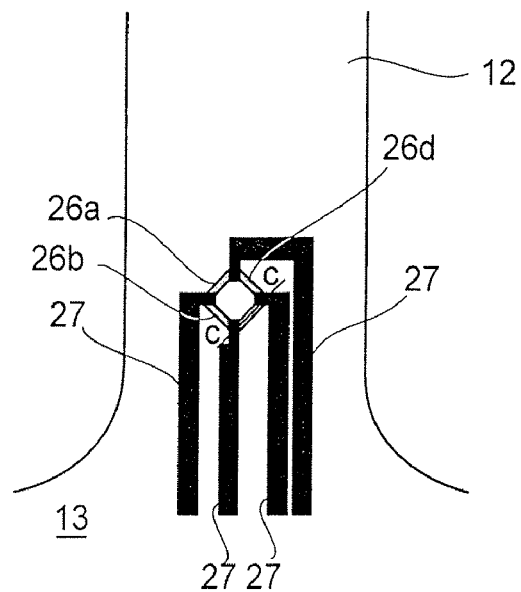
FIG. 9A is a plan view, showing an example of distortion detecting element usable in the present invention.
Figure 10:
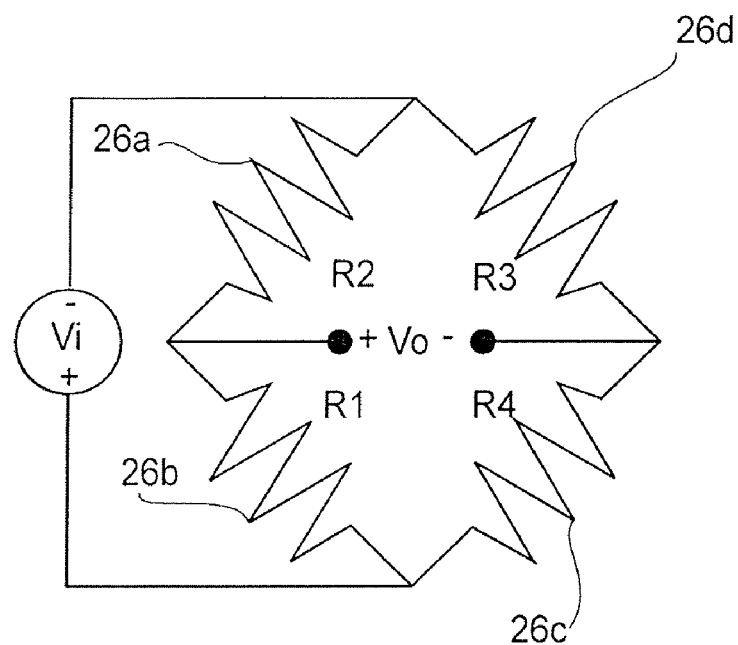
FIG. 10 is a diagram of an equivalent circuitry of an example of a distortion detecting element usable in the present invention.

FIG. 9A is an enlarge plan view of a portion of the first torsion spring where the distortion detecting element 25a is formed. As illustrated, the distortion detecting element 25a comprises four piezoelectric resistors 26a, 26b, 26c and 26d which constitute a Wheatstone bridge circuit as shown in FIG. 10. Electric wires 27 are connected to these piezoelectric resistors 26a-26d, and these wires are connected to at the other ends to the electrode terminals 24 shown in FIG. 5.

Figure 9B:
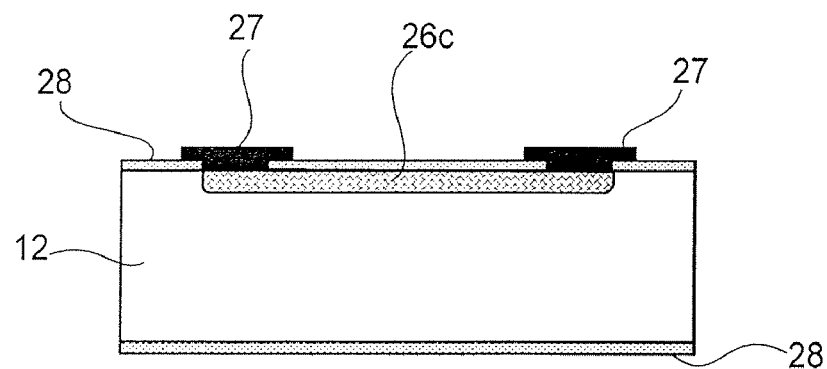
FIG. 9B is a sectional view taken along a line C-C in FIG. 9A, showing a diffused resistor material of the distortion detecting element.

FIG. 9B is a section taken along a line C-C in FIG. 9A. The piezoelectric resistor 26d comprises a diffused resistor material made by diffusing phosphorus into the first torsion spring 12 of p-type monocrystal silicon. An oxide film of silicon is formed on the resistor material as an insulating layer 28. The remaining three piezoelectric resistors 26a, 26b and 26d have a similar sectional structure. Furthermore, the distortion detecting element 25b formed on the second torsion spring 14 has a similar structure. Hence, these distortion detecting elements 25a and 25b can be produced at the same time in the manner described above. Thus, they can be produced inexpensively.

Furthermore, since the oscillating system 160 is made of monocrystal silicon, these distortion detecting elements can be formed integrally based on a diffused resistor material made by diffusing impurities into the first or second torsion spring 12 or 14. This enables inexpensive production.

Next, referring to an equivalent circuitry of the distortion detecting element 25a shown in FIG. 10, the principle of detecting the displacement angle of the oscillator movable element will be explained. As shown in FIG. 10, the four piezoelectric resistors 26a, 26b, 26c and 26d constitute a Wheatstone bridge circuit. Since as shown in FIG. 9A these piezoelectric resistors 26a-26d are formed with a tilt of 45 degrees with respect to the oscillation axis 17, if a torsional displacement about the oscillation axis 17 is produced in the first torsion spring 12, it causes a large distortion of the piezoelectric resistors 26a-26d in their lengthwise direction. Due to the piezoelectric resistance effect described above, such distortion causes a change of the electric resistance of the four piezoelectric resistors 26a-26d.

Here, in the equivalent circuitry shown in FIG. 10, the piezoelectric resistors 26a-26d have an electric resistance R0, in a state without distortion. Due to the disposition symmetry, the piezoelectric resistors 26a and 26c as well as the piezoelectric resistors 26b and 26d will receive distortions in the same direction and of the same magnitude. Then, if the rate of change of the electric resistance responsive to the distortion, based on the piezoelectric resistance effect, is denoted by $\xi_1$ and $\xi_2$, then the electric resistances $R_1$, $R_2$, $R_3$ and $R_4$ of the piezoelectric resistors 26a-26d to which the distortion is applied are expressed by the following equations.

$$R_1 = R_3 = (1+\xi_1)R_0 \tag{8}$$

$$R_2 = R_4 = (1-\xi_2)R_0 \tag{9}$$

Hence, in response to a driving voltage $V_i$ applied to the bridge circuit as shown in FIG. 10, an electric resistance change due to the distortion is outputted as an output voltage $V_0$, as follows.

$$\frac{V_o}{V_i} = \frac{R_1 R_3 - R_2 R_4}{(R_1 + R_3)(R_2 + R_4)} \tag{10}$$

In the manner as described, in response to a torsional displacement of the first torsion spring 12, an output voltage $V_0$ is produced. Then, by measuring this output voltage $V_0$ by means of a detecting circuit, not shown, the torsional displacement of the first torsion spring 12 can be detected. The distortion detecting element 25b provided at the second torsion spring 14 operates in accordance with a similar principle and a torsional displacement of the second torsion spring 14 can be detected. Hence, based on the detection signals of the distortion detecting elements 25a and 25b, the displacement angle of the first and second oscillator movable elements 11 and 13 is detected. Furthermore, since the detection signal is outputted in accordance with the change of displacement angle with respect to time, by using a detecting circuit (not shown) it is possible to detect a phase delay from the driving signal of the fixed coil 152 and the driving frequency of the first and second oscillator movable elements 11 and 13. Moreover, by driving the fixed coil 152 with a constant electric current at different frequencies and by comparing the output voltages $V_0$ of the distortion detecting elements 25a and 25b, it is possible to detect the frequency of natural oscillation mode.

As described above, the distortion detecting element is disposed at the torsion spring and, since the torsion spring receives large mechanical distortion due to displacement of the two oscillator movable elements, the displacement angle can be effectively detected by this distortion detecting element.

In the manner described above, use of the distortion detecting elements 25a and 25b enables detection of three variables $\phi_1$, $\phi_2$ and $\alpha$ of the sinusoidal-wave combined drive shown in Equation (7) and the frequencies $f_1$ and $f_2$ of the natural oscillation modes. However, the rate of change of electric-resistance denoted by $\xi_1$ and $\xi_2$ of the distortion detecting elements 25a and 25b is changeable with temperature. As a result, once the environmental temperature changes, the absolute value of output voltage $V_O$ responsive to the distortion becomes unstable. Hence, if there is an environmental temperature change, variables such as $\phi_1$ and $\phi_2$ of Equation (7) cannot be detected exactly.

These inconveniences are removed in this working example in the manner described below, and the frequencies $f_1$ and $f_2$ of the natural oscillation modes are stabilized at around the target frequencies regardless of an environmental temperature change and, additionally, three variables $\phi_1$, $\phi_2$ and $\alpha$ are detected exactly.

To this end, first, the heat generating amount of the heater wire 19 is adjusted based on the detected values of the frequencies $f_1$ and $f_2$ of the natural oscillation modes, detected by the distortion detecting elements 25a and 25b, so that the frequencies $f_1$ and $f_2$ are constantly tuned around their target frequencies $f_0$ and $2f_0$, respectively. Here, the frequencies $f_1$ and $f_2$ of the natural oscillation modes are detected based on the comparison of output voltage $V_O$ mentioned above. This is a relative detection quantity not easily affected by the precision of the absolute value of the output voltage $V_O$ which is susceptible to the environmental temperature change. Therefore, this frequency tuning can be made accurately regardless of the environmental temperature change.

Since there is a good correlation between the optical deflector temperature and the natural oscillation mode frequency, the natural oscillation mode frequency adjustment using the heater wire 19 assures a substantially constant optical deflector temperature regardless of the environmental temperature change. Hence, after the natural oscillation mode frequencies $f_1$ and $f_2$ are well adjusted, the rate of change of electric resistance $\xi_1$ and $\xi_2$ of the distortion detecting elements 25a and 25b will become substantially constant. As described, after the frequency adjustment, exact values of $\phi_1$ and $\phi_2$ and so on are detectable. Therefore, the drive control unit is now operable to correct, based on these detected values, the driving signal to be supplied to the driving unit so that a desired sinusoidal-wave combined drive is produced thereby.

In the optical deflector according to this working example, as described above, a heater wire (heat generating element) and a distortion detecting element are used, and good sinusoidal-wave combined drive is produced stably regardless of an environmental temperature change.

SECOND WORKING EXAMPLE

Figure 7:
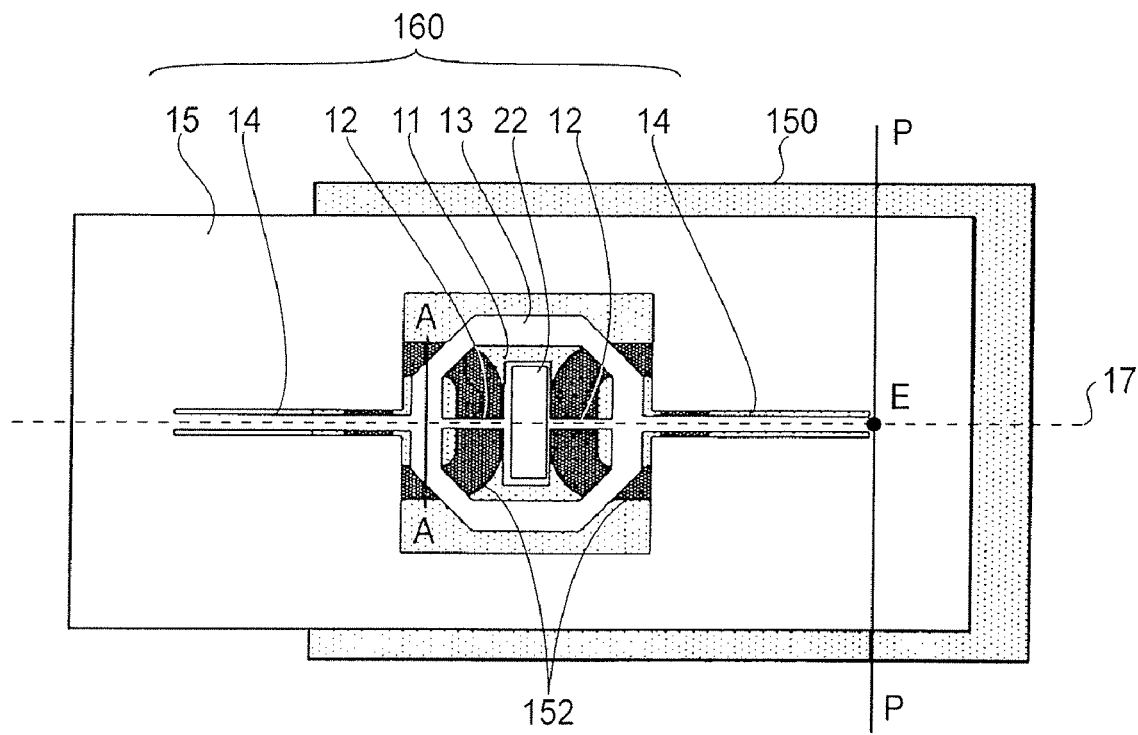
FIG. 7 is a plan view of an optical deflector according to a second working example of the present invention.
Figure 8:
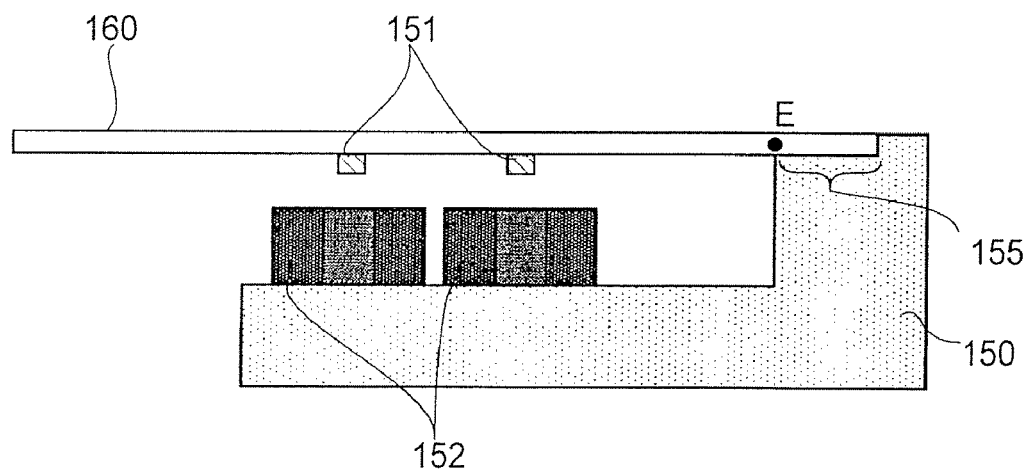
FIG. 8 is a cross-section of the optical deflector according to the second working example of the present invention.

FIGS. 7 and 8 show an optical deflector according to a second working example of the present invention. FIG. 7 is a plan view, and FIG. 8 is a section taken along a plane containing the oscillation axis 17 and perpendicular to the sheet of the drawing. In these drawings, the components having a similar function as those of the first working example are denoted by like numerals. Hereinafter, description of those portions having a similar function as the first working example will be omitted, and only distinctive features wile be explained. As shown in FIGS. 7 and 8, the optical deflector of this example comprises a first oscillator movable element 11, first torsion springs 12, a second oscillator movable element 13, second torsion springs, a supporting member 15 and a reflection surface 22, all of which are similar to those of the first working example in respect to the material, structure and function.

The oscillating system 160 of this working example includes similar components as the first working example shown in FIGS. 5 and 6. Namely, as shown in FIGS. 5 and 6, distortion detecting elements 25a and 25b are disposed at the first and second torsion springs 12 and 14, respectively, to detect distortion responsive to the oscillation of the first and second oscillator movable elements 11 and 13. Furthermore, the supporting member 15 is equipped with a heater wire 19 as illustrated, which generates heat in response to voltage application to control the temperature of the oscillating system 160.

As compared with the first working example, this working example has such structure that a stress in the oscillation axis 17 direction is not easily transmitted to the first and second torsion springs 12 and 14. This facilitates stabilization of the natural oscillation mode frequencies $f_1$ and $f_2$.

Figures 13A, 13B:
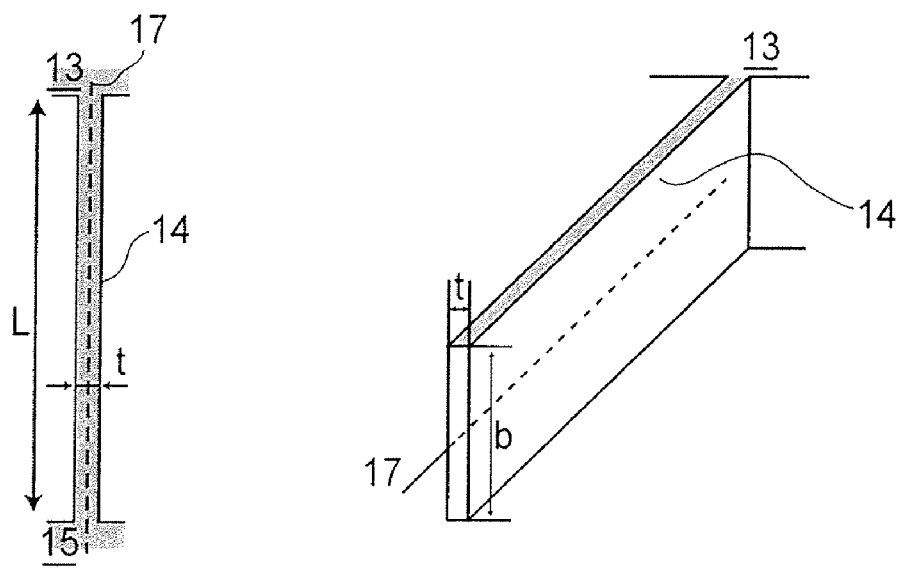
FIG. 13A is a plan view, showing an example of second torsion spring in an optical deflector according to the present invention.
FIG. 13B is a perspective section of the second torsion spring of FIG. 13A.

When a stress in the oscillation axis 17 direction applies to the first and second torsion springs 12 and 14, the spring constants of these springs change in accordance with their sectional shape. The first and second torsion springs 12 and 14 of this working example have a rectangular sectional shape. If the aspect ratio of that section is large, the spring constant can be approximated as follows.

$$K = \frac{Gbt^3}{3L}\left(1 + \frac{b^2}{4Gt^2}\sigma\right) \quad (11)$$

wherein K is the spring constant of the torsion spring, G is a modulus of transverse elasticity, and $\sigma$ is the stress in the oscillation axis 17 direction. FIG. 13A is a plan view of the second torsion spring 14, and FIG. 13B is a sectional and perspective view, showing the section along a plane perpendicular to the oscillation axis 17. As seen from these drawings, L in Equation (11) is the length of the torsion spring, t is the width of the torsion spring, and b is the thickness of the torsion spring.

It follows from Equation (11) that the spring constant K increases as the stress $\sigma$ in the oscillation axis direction increases. The coefficient for that contains a term of square of the ratio between the torsion spring width t and thickness b. The first and second torsion springs of this working example have the same thickness b, but their widths t are different. Thus, even if they receive the same stress $\sigma$, the rate of change of the spring constant is different. This leads to that, when a stress $\sigma$ is transmitted to the first and second torsion springs 12 and 14, the frequencies $f_1$ and $f_2$ of the natural oscillation modes of the oscillating system 160 will change at different rates of change, depending on the stress $\sigma$.

In consideration of this, in this working example, for further stabilization of the natural oscillation mode frequencies $f_1$ and $f_2$, the optical deflector has such structure that the stress $\sigma$ is hardly transmitted to the first and second torsion springs 12 and 14. Specifically, the following structure is used to this end. As shown in FIGS. 7 and 8, in this working example, the adhesion area 155 is defined only at one side of the line P-P being remote from the positions where the first and second oscillator movable elements 11 and 13 are formed, which line is perpendicular to the oscillation axis 17 and extends through the connection point E between one of the paired second torsion spring 14 and the supporting member 15. With this structure, the stress in the oscillation axis 17 direction to be applied to the oscillating system 160 due to various factors such as contraction of the adhesive agent at the adhesion area 155 of the supporting member 15, deformation of the stationary member 150, difference in thermal expansion between the stationary member 150 and the oscillating system 160 and so on, would not be transmitted to any portion other than the supporting member 15. Namely, the stress is hardly transmitted to the first and second torsion springs 12 and 14.

In the optical deflector of this working example having such structure described above, the rate of change to temperature of each of the frequencies $f_1$ and $f_2$ of first-order and second-order natural oscillation modes is $(\Delta f/f)/\Delta T=-46$ ppm/K. With this structure, a stress $\sigma$ in the oscillation axis 17 direction hardly causes a change in the natural oscillation mode frequencies $f_1$ and $f_2$. Thus, the frequencies $f_1$ and $f_2$ are made more stable.

Furthermore, since the structure is such that variation factors of the natural oscillation mode frequencies except the temperature are removed, the temperature stabilization of the optical deflector based on the natural oscillation mode frequency adjustment can be made more exactly and, as a result of this, the outputs of the distortion detecting elements 25a and 25b are made more stable. Based on these detected values, therefore, the driving signal of the driving unit can be corrected more precisely to accomplish desired sinusoidal-wave combined drive.

Furthermore, in this working example, the path through which heat is transferred from the oscillating system 160 to the stationary member 150 by heat conduction is defined only at one position, i.e., the adhesion area 155. Thus, as compared with the structure having two such paths, the heat resistance is larger and hence the power consumption for the temperature adjustment is lower.

THIRD WORKING EXAMPLE

Figures 11A, 11B:
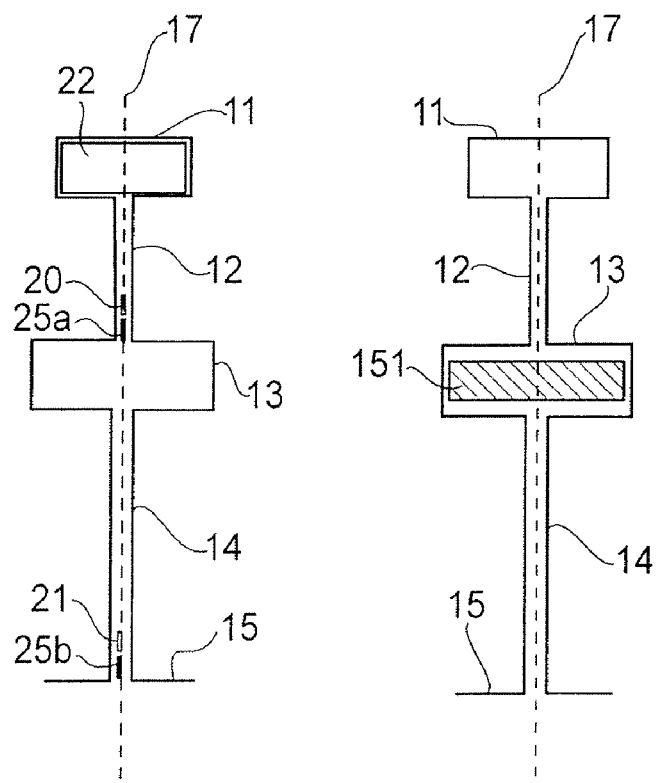
FIG. 11A is a plan view, showing the structure at a side of an oscillating system where a reflection surface is provided, in a third working example of the present invention.
FIG. 11B is a plan view, showing the structure at a side of the oscillating system where no reflection surface is provided, in the third working example of the present invention.

FIGS. 11A and 11B show an optical deflector according to a third working example of the present invention. FIG. 11A is a plan view, showing the structure at a side where a reflection surface 22 of an oscillating system 160 is formed. FIG. 11B is a plan view of the same as seen from the bottom. In these drawings, the components having a similar function as those of the first working example are denoted by like numerals. Hereinafter, description of those portions having a similar function as the first working example will be omitted, and only distinctive features wile be explained. As shown in FIGS. 11A and 11B, the optical deflector of this example comprises a first oscillator movable element 11, a first torsion spring 12, a second oscillator movable element 13, a second torsional spring 14, a supporting member 15 and a reflection surface 22, all of which are similar to those of the first working example in respect to the material, structure and function. As compared with the first working example, the optical deflector of this example includes only one first torsion spring 12 and one second torsion spring 14. Use of a single-torsion-spring structure makes the size of the oscillating system 160 in the oscillation axis 17 direction smaller.

Furthermore, the path through which heat is transferred from the oscillating system 160 to the stationary member 150 by heat conduction is defined only at the single torsion spring. Thus, as compared with the structure having a pair of torsion springs, the heat resistance is larger and hence the power consumption for the temperature adjustment is made much lower. Additionally, since the size of the supporting member 15 can be made smaller because of the single spring (second torsion spring 14) structure, the power consumption for the temperature adjustment is lowered more.

Like the second working example, the supporting member 15 is adhered to the stationary member 150 (not shown in FIGS. 11A and 11B) only at a single adhesion area 155. Thus, in this structure, a stress in the oscillation axis 17 direction is hardly transmitted to the first and second torsion springs 12 and 14, and advantageous effects similar to the second working example are obtainable.

In this working example, as shown in FIG. 11A, first and second heater wires 20 and 21 and distortion detecting elements 25a and 25b are provided at the first and second torsion springs, respectively. These heater wires and distortion detecting elements are electrically connected to a driving voltage circuit and a detecting circuit, respectively, through electrode terminals, not shown, formed on the supporting member 15. In this working example, the heat generating element is provided only at the torsion spring to assure that the temperature of only such portion that would have a largest influence upon the change of natural oscillation mode frequency resulting from the temperature change of the optical deflector, can be adjusted effectively.

Figure 12:
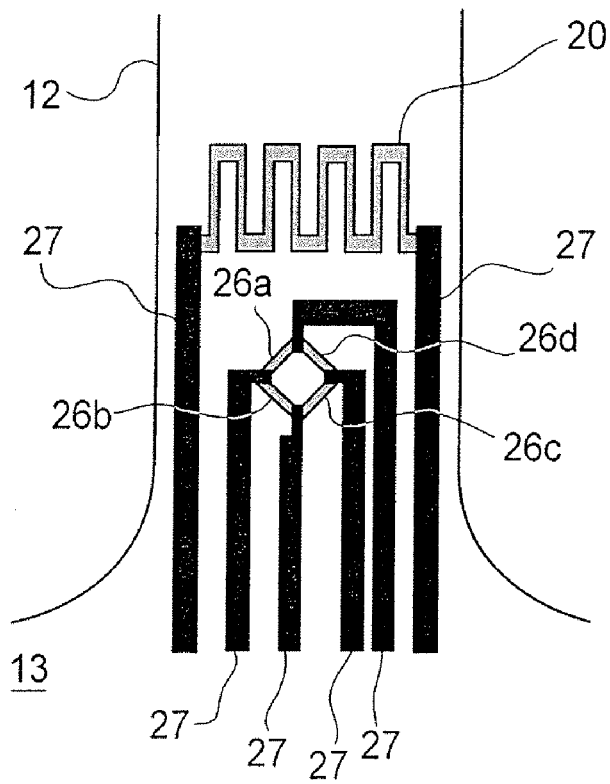
FIG. 12 is a plan view, showing an example of distortion detecting element and heater wire arrangement, according to the present invention.

FIG. 12 is an enlarged plan view of a portion of the first torsion spring 12 where the first heater wire 20 and the distortion detecting element 25a are provided. Like the first working example, the distortion detecting element 25a comprises a bridge circuit having four piezoelectric resistors 26a, 26b, 26c and 26d. Furthermore, like the piezoelectric resistors 26a-26d, the first heater wire 20 is made of a diffused resistor material, made by diffusing phosphorus into a p-type silicon substrate as impurities. Hence, the heater wire 20 and the piezoelectric resistors 26a-26d can be produced simultaneously through an impurity diffusion process used in semiconductor manufacturing processes. The second heater wire 21 and distortion detecting element 26b disposed at the second torsion spring 14 have a similar structure as those shown in FIG. 12.

The first heater wire 20 and the second heater wire 21 may be omitted and, in place thereof, the distortion detecting element 25a and 25b may be used also as a heat generating element. More specifically, by changing the driving voltage Vi (see FIG. 10) for the distortion detection, the heat generating amount of the four piezoelectric resistors 26a-26d may be adjusted to thereby tune the frequencies $f_1$ and $f_2$ of the natural oscillation modes to the respective target driving frequencies $f_0$ and $2f_0$. By doing so, although the signal conversion efficiency (rate of change of electric resistance) for the distortion detection through the distortion detecting elements 25a and 25b may depend on the temperature, after the heat generating amount adjustment described above, this efficiency can be stably made constant.

Furthermore, with the structure in which the distortion detecting element functions also as a heat generating element, the number of required electrical wires is reduced and, hence, the number of electrode terminals (not shown) is reduced. Therefore, the oscillating system 160 can be made small in size. Additionally, since the wiring process is simplified, the optical deflector can be produced inexpensively. Furthermore, the possibility of breakage of wires decreases.

FOURTH WORKING EXAMPLE

Figure 14:
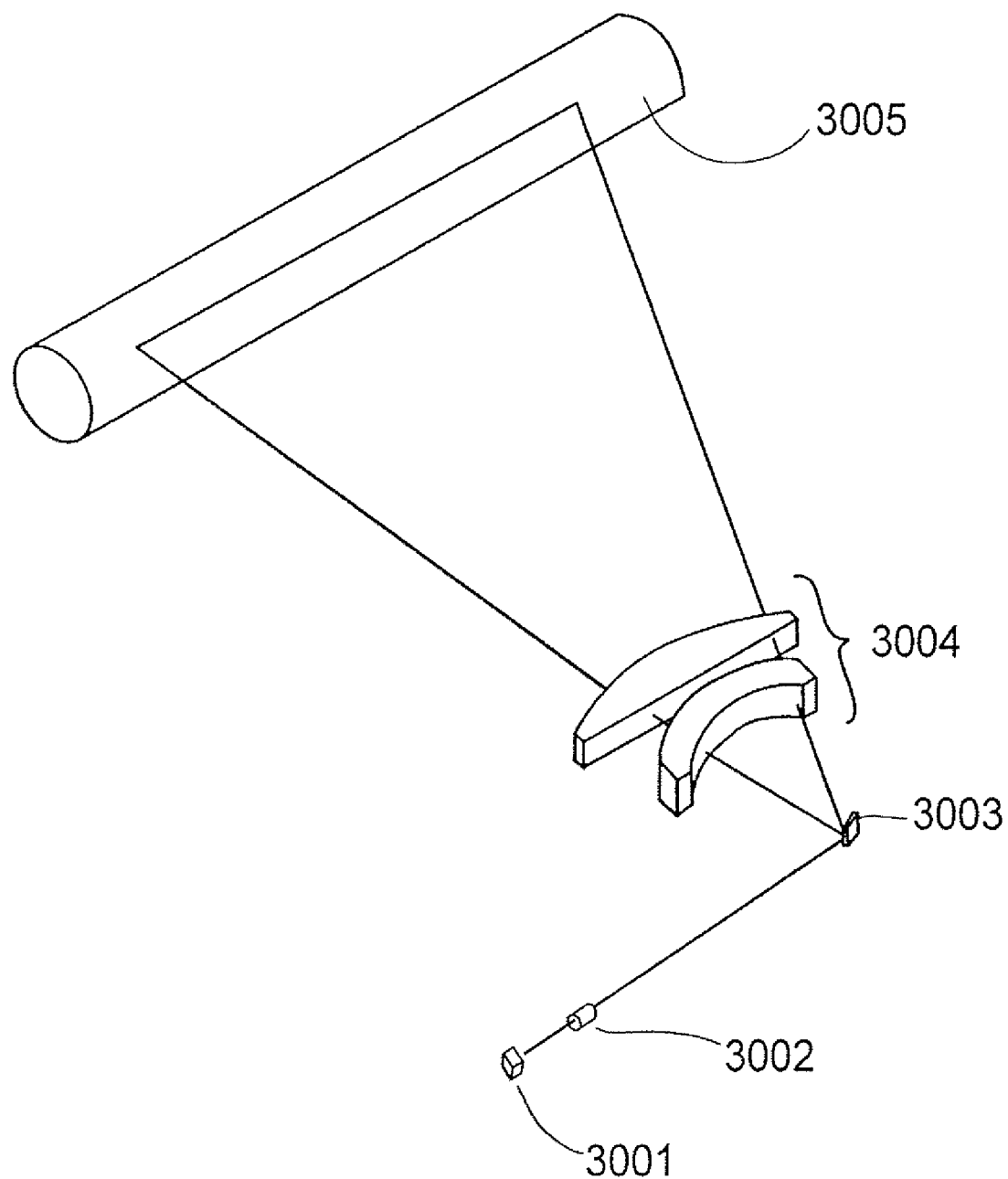
FIG. 14 is a perspective view, showing a working example of an optical instrument having an optical deflector of the present invention.
Figure 15:
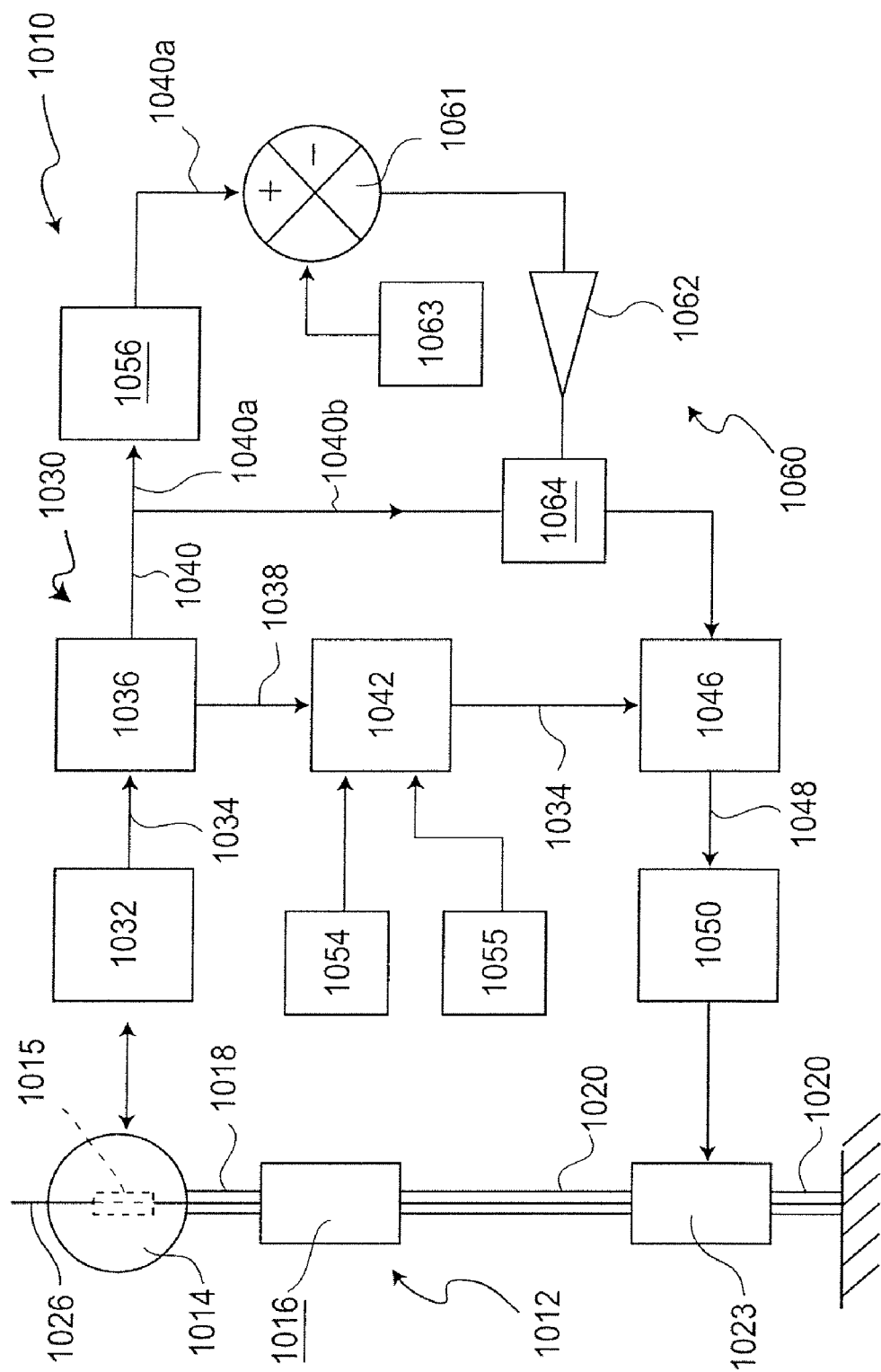
FIG. 15 is a block diagram for explaining an optical deflector of known type.

FIG. 14 is a schematic and perspective view, showing a working example of an optical instrument into which an optical deflector according to the present invention is incorporated. In this example, an image forming apparatus is shown as the optical instrument. In FIG. 14, denoted at 3003 is an optical deflector according to the present invention, and it functions to one-dimensionally scan the light incident thereon. Denoted at 3001 is a laser light source, and denoted at 3002 is a lens or lens group. Denoted at 3004 is a writing lens or lens group, and denoted at 3005 is a drum-shaped photosensitive member.

A laser beam emitted from the laser light source 3001 has been modulated by predetermined intensity modulation related to the timing of deflective scan of light. The intensity-modulated light goes through the lens or lens group 3002, and it is one-dimensionally scanningly deflected by means of an optical scanning system (optical deflector) 3003. The scanningly deflected laser beam is focused by the wring lens or lens group 3004 on the photosensitive member 3005 to form an image thereon.

The photosensitive member 3005 rotates about a rotational axis in a direction perpendicular to the scan direction, and it is uniformly charged by means of a charger, not shown. By scanning the photosensitive member surface with light, an electrostatic latent image is formed in the scanned surface portion. Subsequently, by using a developing device, not shown, a toner image is produced in accordance with the electrostatic latent image, and the toner image is then transferred to and fixed on a transfer sheet, not shown, whereby an image is produced on the sheet.

With the use of the optical deflector 3003 of the present invention, the angular speed of deflective scan of light can be made approximately even within the effective region of the photosensitive member 3005 surface. Furthermore, with the use of the optical deflector of the present invention which can be driven stably, and an image forming apparatus having stable performance is accomplished.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2006-149376 filed May 30, 2006, for which is hereby incorporated by reference.

What is claimed is:

1. An optical deflector, comprising:
    an oscillating system including a first oscillator movable element having a light deflecting element, a second oscillator movable element, a first torsion spring configured to couple said first and second oscillator movable elements with each other and to support said first oscillator movable element for torsional oscillation relative to said second oscillator movable element, a supporting member and a second torsion spring configured to couple said supporting member and said second oscillator movable element with each other and to support said second oscillator movable element for torsional oscillation about an axis the same as an oscillation axis of said first oscillator movable element, relative to said supporting member;
    a driving system configured to apply a driving force to said oscillating system; and
    a drive control system configured to supply a driving signal to said driving system;
    wherein said oscillating system further includes a distortion detecting element configured to detect mechanical deformation of at least one of said first and second torsion springs, and a heat generating element configured to heat said oscillating system, and
    wherein said oscillating system has at least two natural oscillation modes of different frequencies, about the oscillation axis.

2. An optical deflector according to claim 1, wherein said heat generating element is disposed at one or more of said supporting member, said first torsion spring and said second torsion spring.

3. An optical deflector according to claim 1, wherein said distortion detecting element functions also as said heat generating element.

4. An optical deflector according to claim 1, wherein said oscillating system has two natural oscillation modes of different frequencies, one frequency being approximately double or triple the other frequency.

5. A method of driving an optical deflector as recited in claim 1, comprising:
    an adjusting step for adjusting a heat generating amount of the heat generating element by use of first distortion amount information outputted from the distortion detecting element, so that the oscillating system can oscillate at a target frequency; and
    a correcting step to be made after said adjusting step, for correcting a driving signal to be applied to the driving system, on the basis of second distortion amount information outputted from the distortion detecting element.

6. A method of driving an optical deflector as recited in claim 1, comprising:
    an adjusting step for adjusting a heat generating amount of the heat generating element on the basis of first distortion amount information outputted from the distortion detecting element, so that the oscillating system can oscillate at a frequency of a natural oscillation mode corresponding to a target frequency; and
    a correcting step to be made after said adjusting step, for correcting a driving signal to be applied to the driving system, on the basis of second distortion amount information outputted from the distortion detecting element, so that the oscillating system can oscillate at the frequency of the natural oscillation mode.

7. A method of driving an optical deflector as recited in claim 1, comprising:
    an adjusting step for adjusting a heat generating amount of the heat generating element on the basis of a relative value of a distortion amount outputted from the distortion detecting element, so that the oscillating system can oscillate at a target frequency; and
    a correcting step to be made after said adjusting step, for correcting a driving signal to be applied to the driving system, on the basis of an absolute value of a distortion amount outputted from the distortion detecting element.

8. An optical instrument, comprising:
    a light source;
    an optical deflector as recited in claim 1; and
    one of a photosensitive member and an image display member;
    wherein said optical deflector is configured to deflect light from said light source and to direct at least a portion of the deflected light onto said photosensitive member or image display member.

* * * * *